2 Sheets—Sheet 1.

J. SARGENT.

TIME-LOCKS.

No. 7,835. Reissued Aug. 7, 1877.

*Witnesses:*

W. L. Boomb

A. H. Norris.

*Inventor:*

James Sargent

By James L. Norris,

Atty.

N. PETERS, PHOTO-LITHOGRAPHER, WASHINGTON, D. C.

2 Sheets—Sheet 2.

J. SARGENT.

TIME-LOCKS.

No. 7,835. Reissued Aug. 7, 1877.

Witnesses:
Jos. S. Coombs
A. H. Norris.

Inventor:
James Sargent
By James L. Norris.
Atty

N. PETERS, PHOTO-LITHOGRAPHER, WASHINGTON, D. C.

UNITED STATES PATENT OFFICE.

JAMES SARGENT, OF ROCHESTER, NEW YORK.

IMPROVEMENT IN TIME-LOCKS.

Specification forming part of Letters Patent No. 165,878, dated July 20, 1875; Reissue No. 7,835, dated August 7, 1877; application filed April 5, 1876.

*To all whom it may concern:*

Be it known that I, JAMES SARGENT, of Rochester, in the county of Monroe and State of New York, have invented certain new and useful Improvements in Time-Locks, of which the following is a specification:

This invention relates to certain improvements in time-locks, its object being to construct such locks so as to enable them to be used upon safe or vault doors, and to operate in connection with the usual bolt-work or train-bolts arranged thereon.

Figure 1:
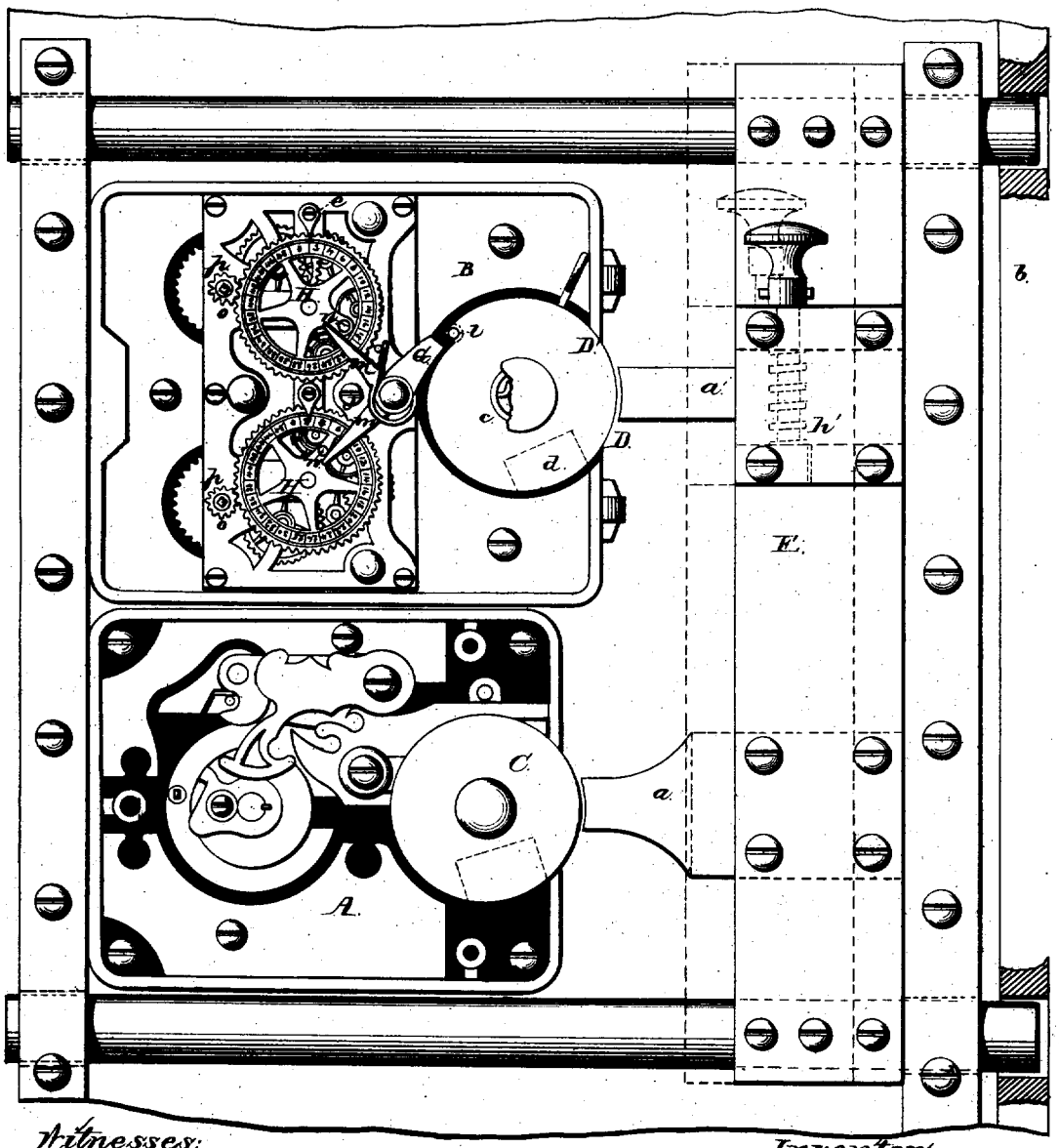
Figure 2:
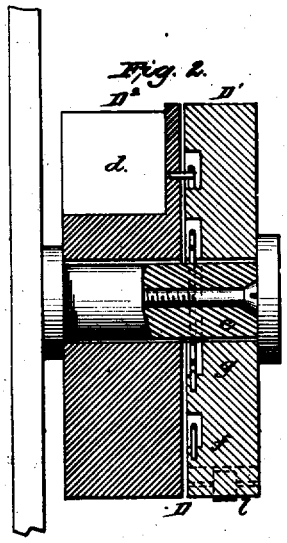
Figure 3:
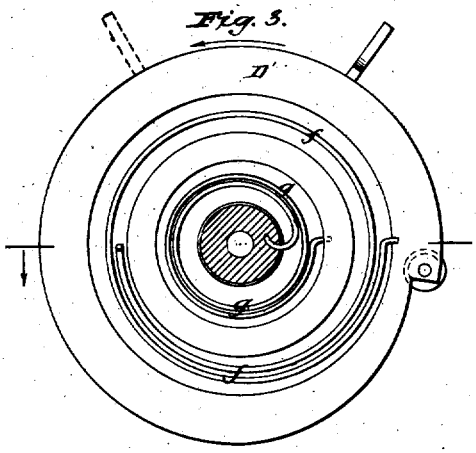
Figure 4:
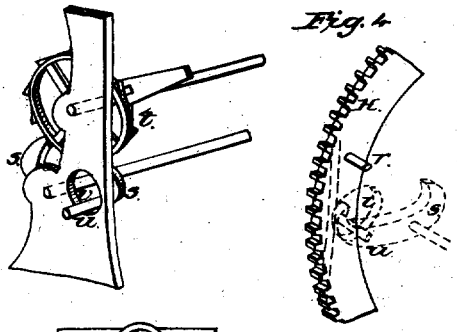
Figure 5:
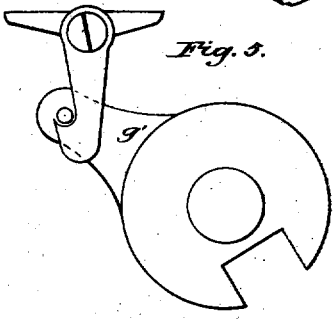

In the drawings, Figure 1 illustrates a portion of a safe or vault door having thereon a time-lock and a combination-lock, both of said locks being represented in a locked condition, with the bolt-work projected and locked. Fig. 2 illustrates one form of lock-bolt or obstruction for use in a time lock. Fig. 3 illustrates an inside view of said lock-bolt or obstruction. Fig. 4 represents detached views of the pallet and escape-wheel, and a portion of one of the revolving dials. Fig. 5 illustrates another form of lock-bolt or obstruction for use in connection with the time-lock for admitting of locking or unlocking of the bolt-work.

The invention consists, among other things, in the combination, in a time-lock constructed to be applied upon a safe or vault door, to operate in conjunction with the bolt-work thereon, of an obstruction, arranged to be moved to prevent the retraction of the bolt-work, and to release the same at a time determined by the time mechanism; a yoke capable of being vibrated on its axis for retaining the obstruction in a position for keeping the bolt-work locked; two time mechanisms, each having a rotating dial, either or both of which will operate the yoke for removing the obstruction, and to bring it into a position for releasing the bolt-work, so that the same may be retracted for opening the safe or vault door.

The invention further consists in combining, in a time-lock having two separate and independent time mechanisms constructed to be applied upon a safe or vault door, and to operate in conjunction with the bolt-work thereon, two rotating or revolving dials, each of which is rotated by its own time mechanism, and a yoke operated by either or both of said dials to release the obstruction, so as to allow the retraction or unlocking of the bolt-work at the predetermined time for which the dials have been set.

The invention further consists in combining, with the mainspring-arbor, a revolving dial, which is moved thereby for setting the time mechanism to unlock at a predetermined time, said mainspring-arbor and revolving dial being operated by gearing in such a manner that the setting of the time mechanism to unlock at any given time will necessarily wind up the time mechanism to the extent that it will unwind by the arrival of the predetermined time for unlocking.

The invention further consists in constructing the lock-bolt or obstruction of a time-lock which is to operate in conjunction with the bolt-work of a safe or vault door in two parts, connected together and subjected to the action of a spring in such a manner that each of said parts composing the bolt or obstruction can have an independent turning movement, in order that the said bolt or obstruction will remain stationary except during the brief interval when locking or unlocking is being effected, and adapted to turn on its axes or pivot to admit of the bolt-work being retracted at a time determined by the time mechanism.

The invention further consists in combining stop-pins with the dial and pallet, for stopping the movement of time mechanism when the time-lock is unlocked.

The drawings illustrate a portion of a safe or vault door having thereon a bolt-work, a time-lock, and a combination-lock, each of said locks having a lock-bolt or obstruction for operating in conjunction with the bolt-work, said lock-bolts or obstructions being so constructed and arranged that in one position they will prevent the retraction or unlocking of the bolt-work, while in another position they will admit of the retraction of said bolt-work for unlocking the safe or vault door.

The combination above described forms the subject-matter of an application for Letters Patent filed by me in the United States Patent Office March 12, 1875, and, therefore, is not claimed in this application.

Referring to the drawings, the letter A designates a combination or key lock, and B the time or chronometer lock. These locks are each supplied with a lock-bolt or obstruction, C D, both of which are constructed with a notch or recess, so that when said notches or recesses are brought in line with the tongue-pieces *a a'*, arranged upon the carrying-bar E of the bolt-work, said tongue-pieces can be made to enter said notches or recesses, and thus enable the bolt-work to be retracted for opening the safe or vault door; but when the bolt-work is projected or cast the lock-bolts or obstructions are moved, or placed so as to present a bearing surface to the tongue-pieces, as shown, for example, in Fig. 1, and thus the bolt-work is kept in a projected or locked condition, and can only be retracted when the lock-bolts or obstructions of both locks are brought to the proper position for releasing the bolt-work.

The two locks are separate and independent of each other, and complete in themselves, and are each so constructed that they may be placed at any position on a safe or vault door.

The combination or key lock, if such be employed, will naturally be located in line with the dial-spindle or key that operates it; but the time-lock may be placed anywhere on the safe or vault door where sufficient space is present for it, and the tongue piece *a'* of the carrying-bar of the bolt-work may be of any required length, bent or otherwise arranged, so as to connect with or rest against the lock-bolt or obstruction when the latter is moved to the proper position for obstructing or dogging the bolt-work, and prevent its retraction or unlocking.

When it is desired to lock or fasten a safe or vault with the time-lock some mechanical arrangement or device should be employed to enable the time-lock to be set while the bolt-work remains in a full retracted or unlocked position, so that the safe or vault door can be closed, and, when the bolt-work is projected or cast for securing the door, the lock-bolt or obstruction will retain the same in its projected or locked condition until the arrival of the time determined by the time mechanism, when the lock-bolt or obstruction will be automatically moved and brought into a position for admitting of the retraction and unlocking of the bolt-work.

To accomplish such, a lock-bolt or obstruction of various forms can be employed—such, for instance, as those illustrated in Figs. 1, 2, 3, and 5.

The lock-bolt or obstruction D, illustrated in Figs. 1, 2, and 3, is constructed in two parts, $D^1$ $D^2$, each part adapted to turn independently of the other and on the same bearing *c*. The inner part $D^2$ has a notch, recess, or offset, *d*, into which the tongue-piece, fixed upon the carrying-bar of the bolt-work, enters when retracted or drawn back, so as to open the safe or vault door. Said inner part $D^2$ is connected to the outer part $D^1$ by a spring, *f*, resting in a recess or cavity in the side of the outer part. The outer part $D^1$ is also connected by a spring, *g*, with the bearing *c*. The spring *g*, being connected with the outer part $D^1$ and with its bearing, causes the outer part to be moved or turned, so that the notch, recess, or offset *d* of the inner part $D^2$ is brought into a position to allow the tongue-piece *a'* of the bolt-work to enter it, and thus the bolt-work can be retracted, and when so retracted the outer part $D^1$ is turned or moved, and made to connect or engage with a dog or portion of a yoke, while the inner part $D^2$ remains stationary, being prevented from moving or turning by the tongue-piece of the bolt-work.

The parts constituting the lock-bolt or obstruction, and forming a part of the time-lock, being thus constructed, arranged, and adjusted, the time mechanism having been previously wound and set, the safe or vault door is then closed, and the bolt-work projected or cast. The tension of the spring *g* causes the part $D^2$ to be moved or turned, and presents a bearing for the tongue-piece to rest against, thereby dogging or obstructing the bolt-work, and preventing its retraction.

The parts $D^1$ $D^2$ are supplied with suitable stops, by which their motion is gaged, so as to bring the notch, recess, or offset of the part $D^2$ in proper position in its throw to coincide with the tongue-piece.

A time-lock provided with a lock-bolt or obstruction, as just described, is specially intended to be used on a safe or vault door, to operate in conjunction with the bolt-work and its carrying-bar, having a fixed tongue-piece, such, for instance, as that designated by the letter *a* in Fig. 1 of the drawings, though, if desired, it can be used in conjunction with the adjustable tongue-piece, as shown in the drawings.

In lieu of forming the lock-bolt or obstructions of two parts, as above described, it has been found eminently practical and successful to employ a lock-bolt or obstruction made in a single piece or as an integral, and it may be arranged to have either a turning or sliding action.

Such a lock-bolt or obstruction is shown in Fig. 5 of the drawings, and, as it will be perceived, it is constructed with a notch, recess, or offset, to admit of a tongue-piece entering it when the bolt-work is retracted for unlocking the safe or vault door, and said lock-bolt or obstruction is likewise provided with an arm, *g'*, having a pin or stud for engaging or connecting with a yoke in such a manner that when said arm and yoke are in connection the lock-bolt or obstruction will be placed so as to prevent the retraction of the bolt-work, and when said arm and yoke are disconnected the lock-bolt or obstruction will automatically be placed in a proper position for allowing the bolt-work to be retracted; and such automatic movement of the lock-bolt or obstruction is due to the arm *g'* acting as a counter-weight.

When a lock-bolt or obstruction of the character last described is employed, some provision must be made for setting and adjusting the time-lock prior to closing the safe or vault door, and such must be accomplished while the bolt-work is in a retracted or unlocked condition; therefore, to enable such to be done, there is arranged on the carrying-bar of the bolt-work a socket or bearing, which is provided with a movable tongue-piece and a spring-bolt, constructed and arranged in such a manner that when the spring-bolt is moved out of contact with the socket or bearing of the movable tongue-piece the carrying-bar and the bolt-work can be retracted, as the socket or bearing on said carrying-bar moves or slides over the tongue-piece in a longitudinal direction, the tongue-piece remaining stationary, as one end of it bears upon the lock-bolt or obstruction, and in such condition the safe or vault door can be closed, and when the bolt-work is projected or cast into the jamb of the door the socket or bearing moves along the tongue-piece until the spring-bolt engages with it, when it will be automatically locked in place and the bolt-work securely fastened.

From the foregoing it will be seen that the lock-bolt or obstruction shown in the several figures are each stationary, except during the brief intervals when locking or unlocking is being effected, and that each is adapted to be turned on its pivot or bearing for the purpose of obstructing or dogging the bolt-work and prevent its retraction, or for releasing the bolt-work so that it can be retracted; and it will be further noticed that the lock-bolts or obstructions are so located, and with respect to the time mechanism, that if pressure be exerted upon them by force applied to the bolt-work, such pressure or force will not be transmitted to the delicate workmanship composing the time mechanism.

In order to bring and retain the lock-bolt or obstruction in a position to have the same obstruct and prevent the retraction of the bolt-work, or to move it to release the bolt-work, to enable the same to be retracted, there is arranged in the time-lock a yoke, G, which is capable of being oscillated or turned on its axis or pivot, said yoke being acted upon by two rotating dials, H H, in such a manner that said yoke will be operated by either or both of said revolving dials at the predetermined time for which said revolving dials have been set.

In the example shown in Fig. 1, the yoke engages under a stop, *l*, preferably a roller, arranged on the lock-bolt or obstruction, when the latter is brought into a position for obstructing the bolt-work, to prevent its retraction, while, in the example shown in Fig. 5, said yoke connects or engages with the lock-bolt or obstruction. In both examples the yoke retains the lock-bolt or obstruction in a position for obstructing and preventing the retraction of the bolt-work until the arrival of the predetermined time for which the revolving dials have been set.

The arms or members *m m* of the yoke extend over a portion of the revolving dials from which project pins, and when either of said pins comes in contact with the arms or members of said yoke, which will occur at the arrival of the time previously determined upon when setting the revolving dials, it (the said yoke) will be operated or turned on its axis or pivot, and release the lock-bolt or obstruction, and cause the same to be brought into a position to permit the bolt-work to be retracted, which is accomplished by turning the knob or handle connected with the carrying-bar, said knob or handle being on the outside of the safe or vault door.

It is preferred to use two independent time mechanisms, each connected with, and operating one of, the revolving dials, so that if one of the time mechanisms should accidentally stop, the other would be sure to operate the yoke, and by its movement release the lock-bolt or obstruction, which would automatically assume such a position as to present an unobstructed pathway for the tongue-piece to move in, and thus the bolt-work could be released and be left free to be withdrawn or retracted.

The revolving dials are cogged—that is, provided with teeth, which engage with the arbor *o* of the mainspring-barrel, either directly or by means of the pinion *p* attached to said arbor, or through intermediate gearing—so that the setting of the time mechanism for operating the yoke at any given time will necessarily wind up the time mechanism to the extent, at least, that it will unwind by the arrival of the predetermined time at which the lock-bolt or obstruction is to be released for enabling the bolt-work to be retracted.

The revolving dials are indexed or marked with a scale from zero (0) upward to 48, or any other number corresponding with the longest interval the time-lock is to present its lock-bolt or obstruction to obstruct the bolt-work at one time, say from Saturday night to Monday morning. This scale is used in conjunction with a pointer or index, *e*, arranged in the time-lock above the revolving dials.

In setting the time-lock the revolving dials are turned or moved backward from zero (0) to any number in the scale that will indicate the number of hours the safe or vault door is to remain closed or locked, and the pins *n* of the revolving dials must be so adjusted with reference to the scale and the yoke as to come in contact with the arms or members *m m* that either or both of the latter will act upon the yoke, causing it to move so as to release the lock-bolt or obstruction of the time-lock when the zero (0) mark arrives at the index or pointer.

The winding up of the time mechanism and the setting of the revolving dials are performed simultaneously by imparting proper motion to the arbor *o* of the mainspring-barrel.

The revolving dials are provided with a pin, *r*, as shown in Fig. 4, the same serving as a stop.

On the pallet *s*, which engages with the escape-wheel *t*, is a pin *u*, which projects out through a slot, *v*, of the stationary time mechanism frame, the whole arranged in such a manner that as soon as the revolving dial has acted upon the yoke for causing it to release the lock-bolt or obstruction, the pin *r* of the said revolving dial will strike the pin *u* of the pallet, and lock the latter in the escape-wheel, thereby stopping the time mechanism, so that there will be no loss of power, as it is intended that the time-lock should be wound up when first finished, prior to adjusting in place the revolving dials; and, further, by stopping the time mechanism, as above described, the revolving dials cannot get out of position with respect to the index or pointer.

By my invention the time-lock cannot be reset without winding, for the pins of the revolving dials resting in contact with the arms or members of the yoke, prevent it from being brought into action with the lock-bolt or obstruction until the revolving dials have been moved back the number of hours for which it is designed that the lock shall present its lock-bolt or obstruction to obstruct the bolt-work; thus the resetting of the time-lock requires rewinding of the time mechanism as a necessity, and hence no danger of it being unlocked accidentally during the period of hours for which it is set.

Prior to my invention several time-locks have been protected by Letters Patent, among which I name the time-lock granted Holbrook and Fish, April 28, 1857; the time-lock of A. Holbrook, granted April 13, 1856; and the time-lock of Williams and Cummings, granted May 5, 1857; but as neither of said patents shows or describes the construction, combination, and arrangement of parts composing my time-lock, they are hereby disclaimed.

Having described my invention, what I claim, and desire to secure by Letters Patent, is—

1. The combination, in a time-lock constructed to be applied upon a safe or vault door, to operate in conjunction with the bolt-work thereon, of an obstruction arranged to be moved to prevent the retraction of the bolt-work and to release the same at a time determined by the time mechanism, a yoke capable of being oscillated or vibrated on its axes for retaining the obstruction in a position for keeping the bolt-work locked, two time mechanisms, each having a rotating dial, either or both of which will operate the yoke for removing the obstruction to bring it into a position for releasing the bolt-work, substantially as described.

2. In a time-lock having two separate and independent time mechanisms, constructed to be applied upon a safe or vault door, and to operate in conjunction with the bolt-work thereof, the combination of two rotating or revolving dials, each of which is rotated by its own time mechanism, and a yoke operated by either or both of said dials to remove the obstruction so as to allow the retraction or unlocking of the bolt-work at the predetermined time for which the dials have been set.

3. In a time-lock, the combination, with the mainspring-arbor and a revolving dial moved thereby for setting the time mechanism to unlock at a predetermined time, of gearing whereby the setting of the time mechanism to unlock at any given time will necessarily wind up the time mechanism to the extent that it will unwind by the arrival of the predetermined time for unlocking.

4. In a time-lock, the combination, substantially as set forth, of an obstruction for the bolt-work of a safe or vault door, made in two parts, each having an independent turning movement, and connected together by a spring, said obstruction being stationary, except during the brief intervals when locking or unlocking is being effected, and adapted to be turned on its axes to permit of the bolt-work being retracted at a time determined by the time mechanism.

5. The combination, with the dial and pallet, of stop-pins for stopping the movement of the time mechanism when the lock is unlocked, substantially as described.

JAMES SARGENT.

Witnesses:

JAMES L. NORRIS,

A. H. NORRIS.